United States Patent
Maeda et al.

(10) Patent No.: US 8,730,505 B2
(45) Date of Patent: May 20, 2014

(54) IMAGE FORMING APPARATUS WITH DOCUMENT BOX FOR STORING INPUT DATA RELATING TO EXECUTION CONDITIONS OF FUNCTIONS EXECUTABLE BY THE IMAGE FORMING APPARATUS

(75) Inventors: Tetsuya Maeda, Osaka (JP); Hideki Tennichi, Osaka (JP)

(73) Assignee: Kyocera Mita Corporation (JP)

( * ) Notice: Subject to any disclaimer, the term of this patent is extended or adjusted under 35 U.S.C. 154(b) by 123 days.

(21) Appl. No.: 13/335,254

(22) Filed: Dec. 22, 2011

(65) Prior Publication Data

US 2012/0162716 A1  Jun. 28, 2012

(30) Foreign Application Priority Data

Dec. 27, 2010 (JP) ................................. 2010-290390
Dec. 27, 2010 (JP) ................................. 2010-290391

(51) Int. Cl.
*G06F 3/12* (2006.01)
*G06K 15/00* (2006.01)

(52) U.S. Cl.
USPC .......................... 358/1.15; 358/1.14; 358/1.13

(58) Field of Classification Search
USPC ...................................... 358/1.15, 1.13, 1.14
See application file for complete search history.

(56) References Cited

U.S. PATENT DOCUMENTS

| 2002/0015598 | A1* | 2/2002 | Maeda et al. ................... 399/81 |
| 2003/0163707 | A1* | 8/2003 | Shigeeda ....................... 713/182 |
| 2005/0273620 | A1* | 12/2005 | Kawabata et al. ............. 713/182 |
| 2006/0050291 | A1* | 3/2006 | Morikawa et al. ............ 358/1.13 |
| 2006/0070070 | A1* | 3/2006 | Iwamoto et al. ............... 718/100 |
| 2006/0095399 | A1* | 5/2006 | Murakami et al. ................ 707/1 |
| 2006/0235896 | A1* | 10/2006 | Matoba ......................... 707/200 |
| 2006/0282782 | A1* | 12/2006 | Yamada ........................ 715/733 |
| 2006/0290972 | A1* | 12/2006 | Izumisawa et al. .......... 358/1.15 |
| 2007/0002392 | A1* | 1/2007 | Ogura ........................... 358/448 |
| 2007/0139704 | A1* | 6/2007 | Ogura ........................... 358/1.15 |
| 2007/0285675 | A1* | 12/2007 | Okada et al. .................... 358/1.1 |
| 2008/0030762 | A1* | 2/2008 | Morita .......................... 358/1.14 |
| 2008/0055661 | A1* | 3/2008 | Yoshida ........................ 358/403 |
| 2008/0294983 | A1 | 11/2008 | Hoshino et al. |
| 2010/0141987 | A1* | 6/2010 | Miyamoto .................... 358/1.15 |
| 2010/0265544 | A1 | 10/2010 | Anezaki et al. |
| 2010/0333035 | A1* | 12/2010 | Yoshida ........................ 715/835 |
| 2011/0002003 | A1* | 1/2011 | Suwabe ........................ 358/1.14 |

FOREIGN PATENT DOCUMENTS

JP        2000-194482        7/2000

* cited by examiner

*Primary Examiner* — Houshang Safaipour
*Assistant Examiner* — Walter Yehl
(74) *Attorney, Agent, or Firm* — Gerald E. Hespos; Michael J. Porco; Matthew T. Hespos

(57) ABSTRACT

An image forming apparatus includes an execution controller for operating a function to be operated with function settings provided in a program. When a program is received by a program receiver, the execution controller causes a display controller to display box data stored in a document box related to the received program on a box data selection screen. Subsequently, after the box data selected and input on the displayed box data selection screen is received by a box data receiver, the execution controller handles the received box data as input data and operates the function to be operated with the function settings provided in the received program.

6 Claims, 8 Drawing Sheets

FIG.4

| DOCUMENT BOX | STORAGE AREA |
|---|---|
| USER A'S BOX | .¥box¥userA |
| USER B'S BOX | .¥box¥userB |
| USER C'S BOX | ¥¥ external disk¥box¥user C |

FIG.5

| PROGRAM | FUNCTION | FUNCTION SETTING | | CORRESPONDING DOCUMENT BOX |
|---|---|---|---|---|
| | | SETTING ITEM | SET VALUE | |
| CONFERENCE COPY | COPY | NUMBER OF COPIES | 10 SETS | USER A'S BOX |
| | | SHEET SIZE | A4 | |
| | | MAGNIFICATION | 100% | |
| | | DENSITY | NORMAL | |
| | | AGGREGATE PRINT | 2in1 | |
| | | TWO-SIDED DIVISION | NONE | |
| COMPANY X FAX | FACSIMILE TRANSMISSION | NUMBER OF COPIES | 1 SET | NONE |
| | | SHEET SIZE | A4 | |
| | | MAGNIFICATION | 100% | |
| | | DENSITY | SLIGHTLY HIGH | |
| | | AGGREGATE PRINT | NONE | |
| CIRCULAR COPY | COPY | NUMBER OF COPIES | 1 SET | USER B'S BOX |
| | | SHEET SIZE | A4 | |
| | | MAGNIFICATION | 100% | |
| | | DENSITY | NORMAL | |
| | | AGGREGATE PRINT | NONE | |
| | | TWO-SIDED DIVISION | NONE | |

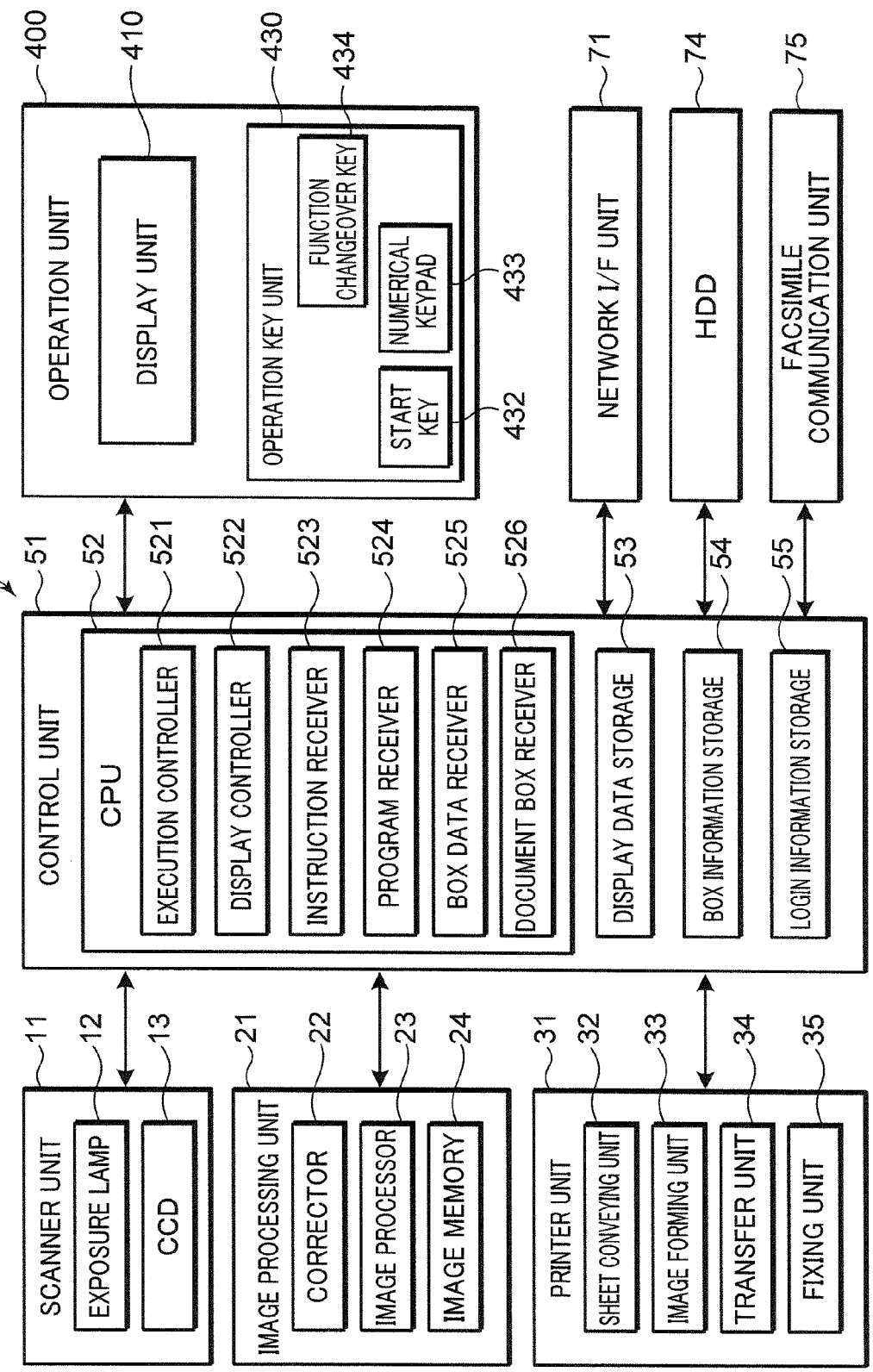

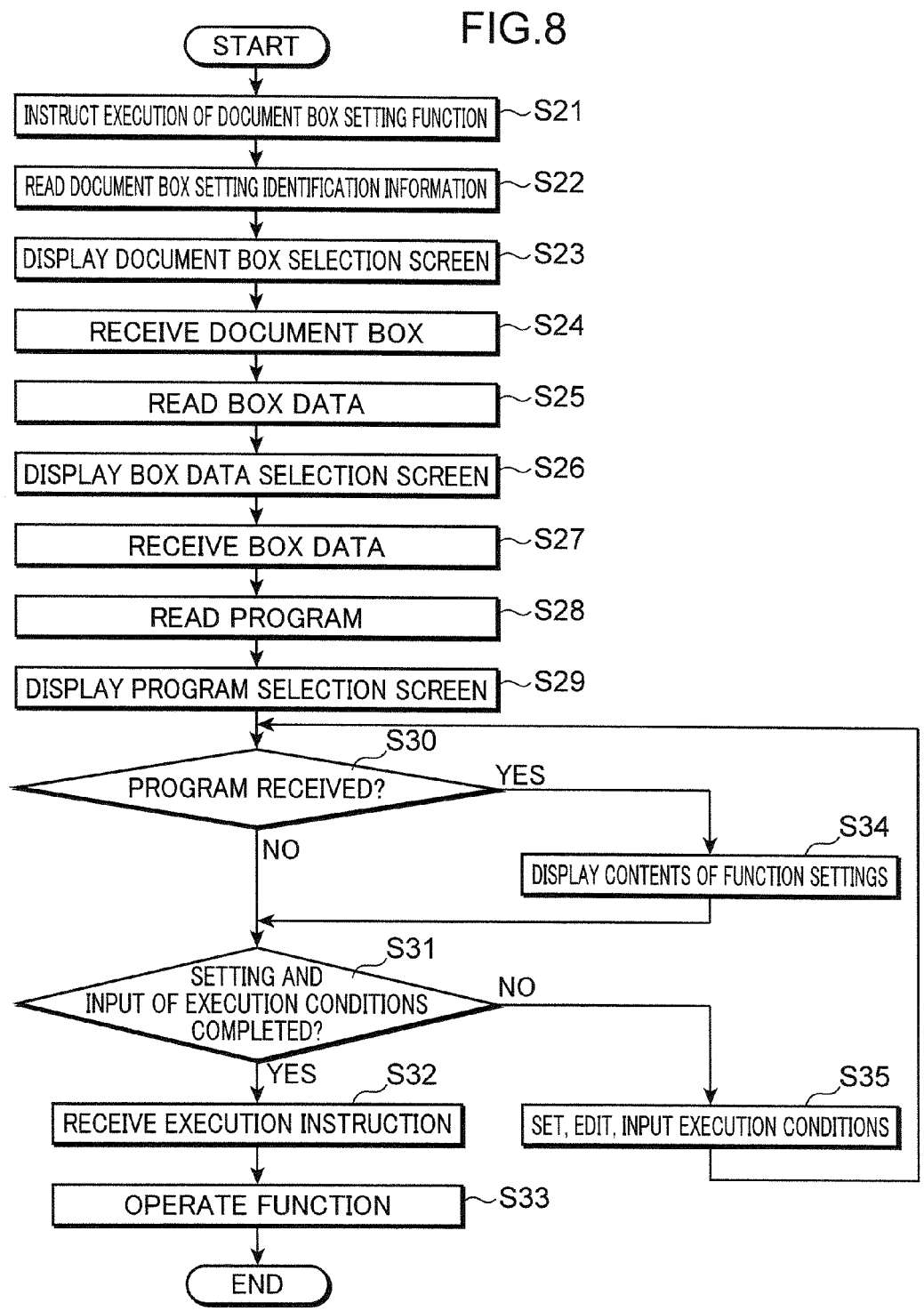

IMAGE FORMING APPARATUS WITH DOCUMENT BOX FOR STORING INPUT DATA RELATING TO EXECUTION CONDITIONS OF FUNCTIONS EXECUTABLE BY THE IMAGE FORMING APPARATUS

CROSS REFERENCE TO RELATED APPLICATIONS

This application is based on Japanese Patent Appl. Nos. 2010-290390 and 2010-290391 filed in the Japanese Patent Office on Dec. 27, 2010, the contents of which are hereby incorporated by reference.

BACKGROUND OF THE INVENTION

The present disclosure relates to a technology for handling data stored in a document box as input data for function items and operating a function executable in an image forming apparatus with a document box.

Conventionally, document boxes used to execute various functional operations executable in an image forming apparatus such as a digital complex machine or a copier have been provided in the image forming apparatus (prior art 1). These document boxes are for storing data read by a scanner and data input via a network from an external apparatus such as a personal computer. The stored data are, for example, output to an external apparatus connected via the network or printed.

There is also known an image forming apparatus capable of registering set parameters necessary to operate a function such as facsimile transmission instructed by a series of operations as a program (prior art 2). In this image forming apparatus, an operation in accordance with the program can be repeatedly performed by reading the registered program.

However, even if the technology of the prior art 2 is applied to the image forming apparatus with document boxes of the prior art 1, a user needs to take time and effort for a plurality of operations. That is, to operate a desired function in accordance with a desired program for data stored in the document box, after performing an operation to designate a document box, the user needs to determine input data by performing an operation to designate desired input data out of data stored in the designated document box and further perform an operation to designate a desired program out of the registered programs.

An object of the present disclosure is to improve user convenience in the case of operating a desired function for data stored in a document box.

SUMMARY OF THE INVENTION

To achieve this object, one aspect of the present disclosure is directed to an image forming apparatus includes an operation unit, a document box, a program storage, a program receiver, a box data receiver, a display controller and an execution controller. The operation unit includes a display unit for displaying various setting screens used to set and input execution conditions of various functions executable in the image forming apparatus and is adapted to receive the execution conditions set and input on the setting screens displayed on the display unit as input data. The document box stores the input data relating to the execution conditions of the function as box data. The program storage stores a program with at least one function setting as a combination of various setting items of the function and set values for the setting items in correspondence with the document box. The program receiver receives the program selected and input on a program selection screen which is one of the setting screens and used to select and input the program stored in the program storage. The box data receiver receives the box data selected and input on a box data selection screen which is one of the setting screens and used to select and input the box data stored in the document box. The display controller causes the display unit to display the various setting screens. The execution controller operates the function to be operated with the function settings provided in the program. The execution controller causes the display controller to display the box data stored in the document box related to the received program on the box data selection screen when the program is received by the program receiver.

The execution controller handles the received box data as the input data and operates the function to be operated with the function settings provided in the received program after the box data selected and input on the displayed box data selection screen is received by the box data receiver.

Another aspect of the present discloser is directed to an image forming apparatus includes an operation unit, a document box, a program storage, a document box, a program receiver, a box data receiver, a display controller and an execution controller.

The operation unit includes a display unit for displaying various setting screens used to set and input execution conditions of various functions executable in the image forming apparatus and is adapted to receive the execution conditions set and input on the setting screens displayed on the display unit as input data. The document box for stores the input data relating to the execution conditions of the function as box data. The program storage stores a program with at least one function setting as a combination of various setting items of the function and set values for the setting items in correspondence with the document box. The document box receiver receives the document box selected and input on a document box selection screen which is one of the setting screens and used to select and input the document box provided in the image forming apparatus. The program receiver receives the program selected and input on a program selection screen which is one of the setting screens and used to select and input the program stored in the program storage. The box data receiver receives the box data selected and input on a box data selection screen which is one of the setting screens and used to select and input the box data stored in the document box The display controller causes the display unit to display the various setting screens. The execution controller operates the function to be operated with the function settings provided in the program. The execution controller causes the display controller to display the box data stored in the received document box on the box data selection screen when the document box is received by the document box receiver. The execution controller causes the display controller to display the program related to another document box different from the document box received by the document box receiver and stored in the program storage on the program selection screen when the box data selected and input on the displayed box data selection screen is received by the box data receiver and handles the received box data as the input data and operates the function to be operated with the function settings provided in the received program after the program selected and input on the displayed program selection screen is received by the program receiver.

These and other objects, features and advantages of the present discloser will become more apparent upon reading the following detailed description along with the accompanying drawings.

BRIEF DESCRIPTION OF THE DRAWINGS

FIG. 4 is a table showing an example of a box information storage, FIG. 5 is a table showing an example of a program storage, FIG. 7 is a block diagram showing the electrical construction of a complex machine according to a second embodiment, and FIG. 8 is a flow chart showing the operation of the complex machine according to the second embodiment.

DETAILED DESCRIPTION OF THE PREFERRED EMBODIMENTS

Hereinafter, embodiments of the present disclosure are described in detail with reference to the drawings. Here, a complex machine is illustrated as an example of an image forming apparatus.

First Embodiment

Figure 1:
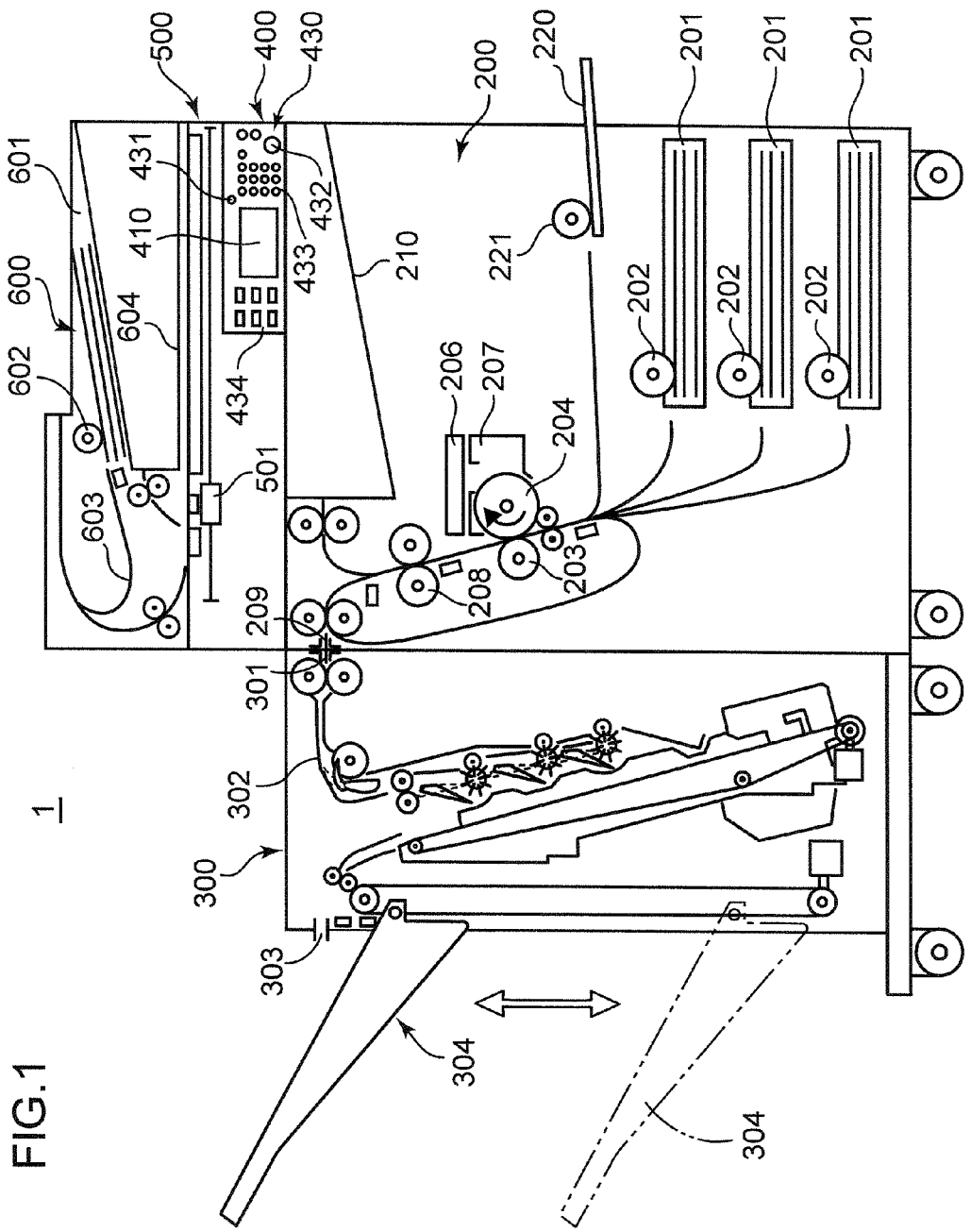
FIG. 1 is a schematic side view showing the construction of a complex machine according to a first embodiment of the discloser.

FIG. 1 is a schematic side view showing the construction of a complex machine 1 according to a first embodiment of the present disclosure. The complex machine 1 includes a main unit 200, a sheet post-processing unit 300 arranged at a sheet discharge side, e.g. left side, of the main unit 200, an operation unit 400 used by a user to input various operation commands and the like, a document reading unit 500 arranged atop the main unit 200 and a document feeding unit 600 arranged atop the document reading unit 500.

Figure 2:
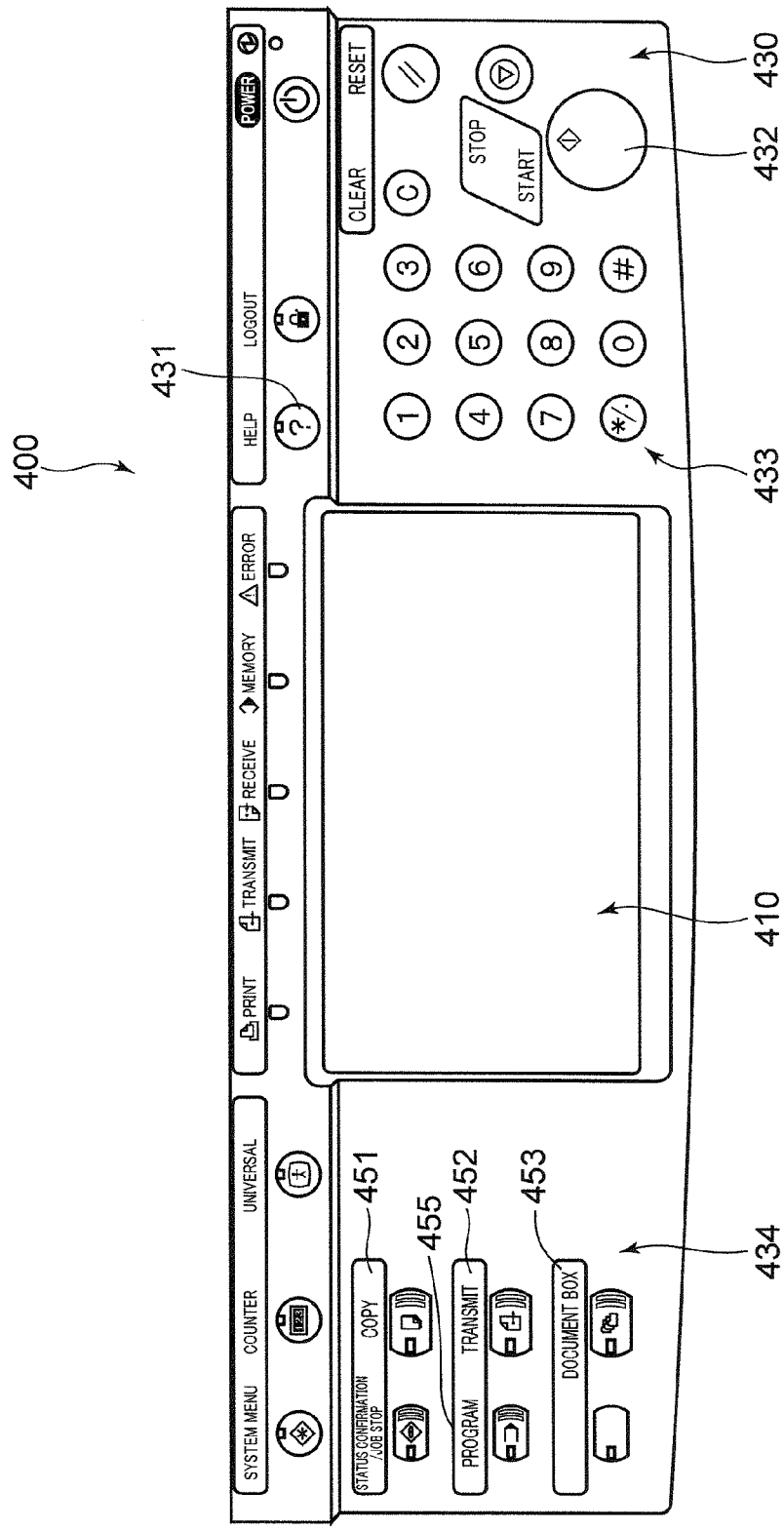
FIG. 2 is a partial enlarged view showing an operation unit provided in the complex machine.

FIG. 2 is a partial enlarged view of the operation unit 400. The operation unit 400 includes a display unit 410 and an operation key unit 430 by which operation instructions are input from the user. The operation key unit 430 includes a help key 431, a start key 432, a numerical keypad 433, function switching keys 434, etc.

The help key 431 is a key for receiving an instruction from the user to cause the display unit 410 to display an operation guide screen (help screen) displaying each operation method relating to a scanner function, a facsimile function, a printer function, a copy function or the like.

The start key 432 is a key for receiving an instruction from the user to start the operation of one of various functions executable in the complex machine 1 such as a copy function and a scan function.

The numerical keypad 433 include keys for receiving set values for various setting items to operate various functions such as the number of copies that are necessary to operate the copy function.

The function switching keys 434 are keys for receiving a function switching instruction to switch a function among a copy function, a transmit function (scanner function, facsimile function, etc.), a document box function, a program function and the like.

The display unit 410 is composed of an LCD (Liquid Crystal Display) and the like and includes a touch panel unit combined with a touch panel. The display unit 410 displays various operation screens such as various setting screens used to set and input execution conditions of various functions. By the user touching a display surface (display operation keys) of the display unit 410, input data for the functions of the complex machine 1 and the selection and input of various execution conditions in operating a function such as various setting items for operating this function are received.

A copy button 451 is a button for receiving an instruction to start the copy function from the user.

A transmit button 452 is a button for receiving an instruction from the user to start a facsimile transmission function of facsimile-transmitting data generated by reading a document by the document reading unit 500 to a designated destination.

A document box button 453 is a button to be depressed in storing data generated by reading a document by the document reading unit 500 in a document box as a storage destination input using the touch panel, the numerical keypad 433 or the like. Note that the document boxes are folders or the like provided in an HDD (FIG. 3) of the complex machine 1 or a removable disk attached to the complex machine 1. The document box button 453 is also a button for receiving an instruction from the user to start the document box function of reading data already stored in a designated document box, handling the read data as input data and performing various functions such as print output and facsimile transmission.

A program button 455 is a button for receiving the input of an instruction from the user to designate a program with at least one function setting as a combination of various setting items of various functions and set values for the respective setting items input using the touch panel, the numerical keypad 433 or the like or start a process of performing an operation such as registration of the program.

When any one of the function switching keys 434 is depressed by the user, an initial display screen of the function corresponding to the depressed button is displayed on the display unit 410 and a process of this function is started.

Referring back to FIG. 1, the document feeding unit 600 includes a document placing portion 601, a feed roller 602, a document conveying unit 603 and a document discharging portion 604, and the document reading unit 500 includes a scanner 501.

The feed roller 602 feeds a given number of documents set on the document placing portion 601 one by one and the document conveying unit 603 successively conveys the fed documents to a reading position of the scanner 501. The scanner 501 successively optically reads images of the documents being conveyed. The read documents are discharged to the document discharging portion 604.

The main unit 200 includes a plurality of sheet cassettes 201, a plurality of feed rollers 202, a transfer roller 203, a photoconductive drum 204, an exposure device 206, a developing device 207, a fixing roller 208, a discharge port 209, a discharge tray 210 and the like.

The photoconductive drum 204 is uniformly charged by a charger (not shown) while being rotated in a direction of an arrow. The exposure device 206 scans the photoconductive drum 204 with a laser beam modulated according to image data generated by reading a document in the document reading unit 500 to form an electrostatic latent image on a drum surface. The developing device 207 develops the electrostatic latent image by supply black developer to the photoconductive drum 204 to form a toner image.

Each feed roller 202 feeds a print sheet from the sheet cassette 201 storing print sheets and conveys it to the transfer roller 203. The transfer roller 203 transfers a toner image on the photoconductive drum 204 to the conveyed print sheet. The fixing roller 208 heats the toner image transferred to the conveyed print sheet and fixes the toner image to this print sheet. Thereafter, the print sheet is carried into the sheet post-processing unit 300 through the discharge port 209 of the main unit 200. Alternatively, the print sheet is discharged to the discharge tray 210 disposed in the main unit 200 if necessary.

The sheet post-processing unit 300 includes a carry-in port 301, a print sheet conveying unit 302, a carry-out port 303, a stack tray 304 and the like. The print sheet conveying unit 302 successively conveys print sheets carried into through the carry-in port 301 from the discharge port 209 and finally discharges the print sheets to the stack tray 304 from the carry-out port 303. Note that the stack tray 304 is vertically movable in directions of arrows according to the number of print sheets carried out from the carry-out port 303 and stacked thereon.

Figure 3:
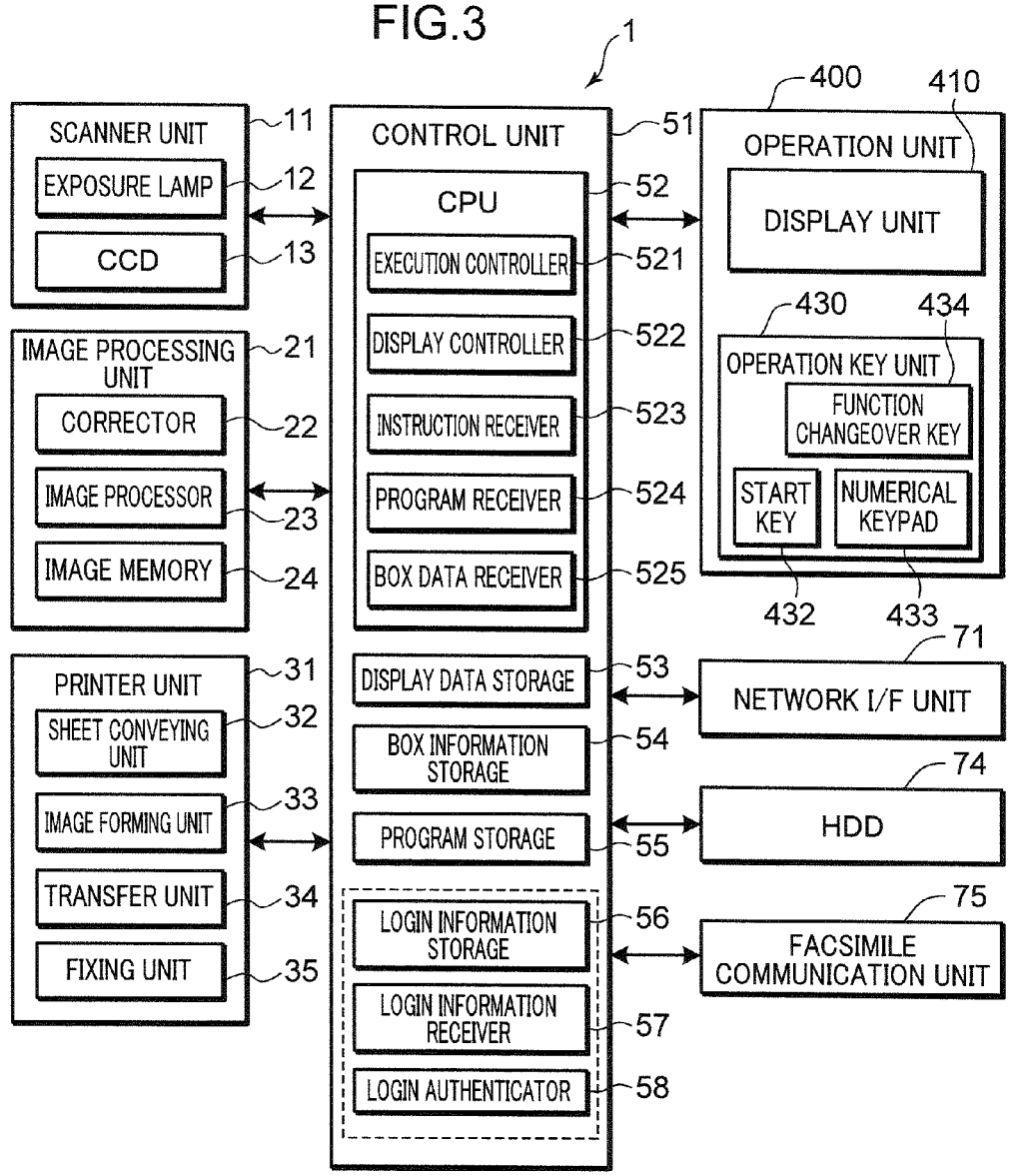
FIG. 3 is a block diagram showing the electrical construction of the complex machine.

FIG. 3 is a block diagram showing the electrical construction of the complex machine 1. The complex machine 1 includes a scanner unit 11, an image processing unit 21, a printer unit 31, the operation unit 400, a control unit 51, a network I/F (interface) unit 71, the HDD (hard disk drive) 74 and a facsimile communication unit 75.

The scanner unit 11 includes an exposure lamp 12 and a CCD 13 constituting the scanner 501 (FIG. 1). The scanner unit 11 irradiates a document by the exposure lamp 12 and performs a document reading operation of focusing reflected light from the document on a light receiving surface of the CCD 13 and generating image data corresponding to the quantity of light received through photoelectric conversion by the CCD 13. The image data (read data) generated by this reading operation is output to the image processing unit 21.

The image processing unit 21 includes a corrector 22, an image processor 23 and an image memory 24. The image processing unit 21 processes the image data read by the scanner unit 11 by the corrector 22 and the image processor 23 if necessary. The data processed by the image processing unit 21 is stored in the image memory 24 for printing or output to the printer unit 31.

The corrector 22 performs predetermined correction processings such as a level correction and a gamma correction on the image data. The image processor 23 performs various processings such as compression or expansion or size enlargement or reduction of image indicated by the image data.

The printer unit 31 includes a sheet conveying unit 32 composed of the sheet cassettes 201, the pickup rollers 202 and the like (FIG. 1), an image forming unit 33 composed of the photoconductive drum 204, the exposure device 206, the developing device 207 and the like (FIG. 1), a transfer unit 34 composed of the transfer roller 203 and the like (FIG. 1), and a fixing unit 35 composed of the fixing roller 208 and the like (FIG. 1).

The printer unit 31 prints an image on a print sheet using image data read by the scanner unit 11. Specifically, the sheet conveying unit 32 conveys the print sheet to the image forming unit 33, the image forming unit 33 forms a toner image corresponding to the above image, the transfer unit 34 transfers the toner image to the print sheet, and the fixing unit 35 forms an image by fixing the toner image to the print sheet.

The network I/F unit 71 controls transmission and reception of various data to and from external apparatuses via a LAN using a network interface (10/100 Base-TX) or the like. The HDD 74 stores data read by the scanner unit 11 and output formats and the like set for this data.

The operation unit 400 includes the display unit 410 and the operation key unit 430 as shown in FIGS. 1 and 2. The display unit 410 displays a plurality of keys for receiving the input of various instructions by a touch panel function under the control of a display controller 522. The operation key unit 430 includes the function switching keys 434, the start key 432, the numerical keypad 433 and the like shown in FIG. 2. A CPU 52 of the control unit 51 receives instructions input by the user from the respective keys of the display unit 410 and the operation unit 400.

The facsimile communication unit 75 includes an encoder/decoder (not shown), a modulator/demodulator (not shown) and an NCU (Network Control Unit) (not shown). The facsimile communication unit 75 transmits image data read by the scanner unit 11 to a facsimile machine or the like via a telephone line and receives data transmitted from a facsimile machine or the like. The encoder/decoder compresses and encodes data to be transmitted and expands and decodes received image data. The modulator/demodulator modulates compressed and encoded data into a sound signal and demodulates a received signal (sound signal) into data. The NCU controls connection with facsimile machines and the like as transmission and reception destinations by the telephone line.

The control unit 51 includes the CPU 52, a display data storage 53, a box information storage 54 and a program storage 55. Note that a login information storage 56, a login information receiver 57 and a login authenticator 58 in FIG. 3 are described later. The CPU 52 is responsible for an operation control of the complex machine 1.

The display data storage 53 stores various data used to display operation guidance to the user. The data is, for example, display data used to cause the display unit 410 to display setting screens used to set and input execution conditions of the function such as a copy operation or a scan operation. Further, the display data storage 53 stores data (including images, characters, symbols and other data) used to display operating statuses of the respective functions such as the scanner function, the facsimile function, the printer function and the copy function.

The box information storage 54 stores information indicating a storage area such as a folder provided, for example, in the HDD 74 of the complex machine 1 or a removable disk attached to the complex machine 1, i.e. a storage area storing data in the document box provided in the complex machine 1 used in the document box function, in correspondence with identification information of the document box.

FIG. 4 is a table diagrammatically showing stored contents in the box information storage 54. For example, data in a document box of identification information "user A's box" is stored in a storage area indicated by ". \box\userA" in the HDD 74 of the complex machine 1. Similarly, data in a document box of identification information "user B's box" is stored in an storage area indicated by ". \box\userB" in the HDD 74 of the complex machine 1. Further, data in a document box of identification information "user C's box" is stored in an storage area indicated by "\\external disk\box\userC" in the removable disk attached to the complex machine 1.

The program storage 55 stores a program with at least one function setting as a combination of setting items of a function executable in the complex machine 1 and set values for the respective setting items in correspondence with the function (the above document box).

FIG. 5 is a table diagrammatically showing stored contents in the program storage 55. For example, the program storage 55 stores a program with six function settings as combinations of six setting items of "number of copies, sheet size, magnification, density, aggregate print and two-sided division" and set values ("10 sets", "A4", "100%", "normal", "2 in 1 (indicating aggregation of 2 pages into 1 page)" and "none") for the respective setting items as a program identified by identification information "conference copy" in correspondence with the "copy function".

Further, the program storage 55 stores a program with five function settings as combinations of five setting items of "number of copies, sheet size, magnification, density and aggregate print" and set values ("1 set", "A4", "100%", "slightly dark" and "none") for the respective setting items as a program identified by identification information "company X FAX" in correspondence with the "facsimile transmission function".

Further, the program storage 55 stores a program with six function settings as combinations of six setting items of "number of copies, sheet size, magnification, density, aggregate print and two-sided division" and set values ("1 set", "A4", "100%", "normal", "none" and "none") for the respective setting items as a program identified by identification information "circular copy" in correspondence with the "copy function".

Note that the program storage 55 stores a program used as an execution condition further in correspondence with the identification information of the document box storing the input data in the case of handling box data as data stored in the document box as input data and operating a function possessed by the complex machine 1.

For example, in the example shown in FIG. 5, the program storage 55 stores the program identified by the identification information "conference copy" in correspondence with the identification information "user A's box". This means that the program identified by the identification information "conference copy" is used in the case of handling box data stored in the document box identified by the identification information "user A's box" as input data relating to the execution conditions of the copy function and performing the copy function.

Further, the program storage 55 stores the program identified by the identification information "circular copy" in correspondence with the identification information "user B's box". This means that the program identified by the identification information "circular copy" is used in the case of handling box data stored in the document box identified by the identification information "user B's box" as input data relating to the execution conditions of the copy function and performing the copy function.

On the other hand, the program storage 55 stores the program identified by identification information "company X FAX" without relating it to a specific document box. This is because the program identified by the identification information "company X FAX" assumes a case of operating the facsimile transmission function with the function settings by this program using not only box data stored in the document box, but also data read by the scanner unit 11 as input data.

Referring back to FIG. 3, the CPU 52 includes a display controller 522, an instruction receiver 523, a program receiver 524, a box data receiver 525 and an execution controller 521.

The display controller 522 controls a display operation of the display unit 410. The display controller 522 causes the display unit 410 to display various setting screens used, for example, to receive input data for the function such as the copy operation or the scan operation and set and input execution conditions of the function such as function settings.

The instruction receiver 523 receives the set and input various execution conditions when various setting screens are displayed on the display unit 410 by the display controller 522. These execution conditions are input data for a function to be operated set and input, for example, using the touch panel function, the numerical keypad 433 or the like provided in the display unit 410, at least one function setting of this function, and a program registration instruction which is an instruction to register at least one function setting as a program as described later. Further, the instruction receiver 523 receives an execution instruction to operate the function to be operated under the execution conditions received, for example, in response to depression of the start key 432 or the like.

The program receiver 524 receives a program selected and input on a program selection screen which is one of the setting screens and used to select and input a program stored in the program storage 55.

The box data receiver 525 receives box data selected and input on a box data selection screen which is one of the setting screens and used to select and input box data stored in the document box.

The execution controller 521 is responsible for an operation control of the respective units (scanner unit 11, image processing unit 21, printer unit 31, etc.) of the complex machine 1. In this embodiment, the execution controller 521 operates the function to be operated in accordance with the execution conditions (function settings) set and input on various setting screens and received by the instruction receiver 523, the program receiver 524 or the box data receiver 525.

Figure 6:
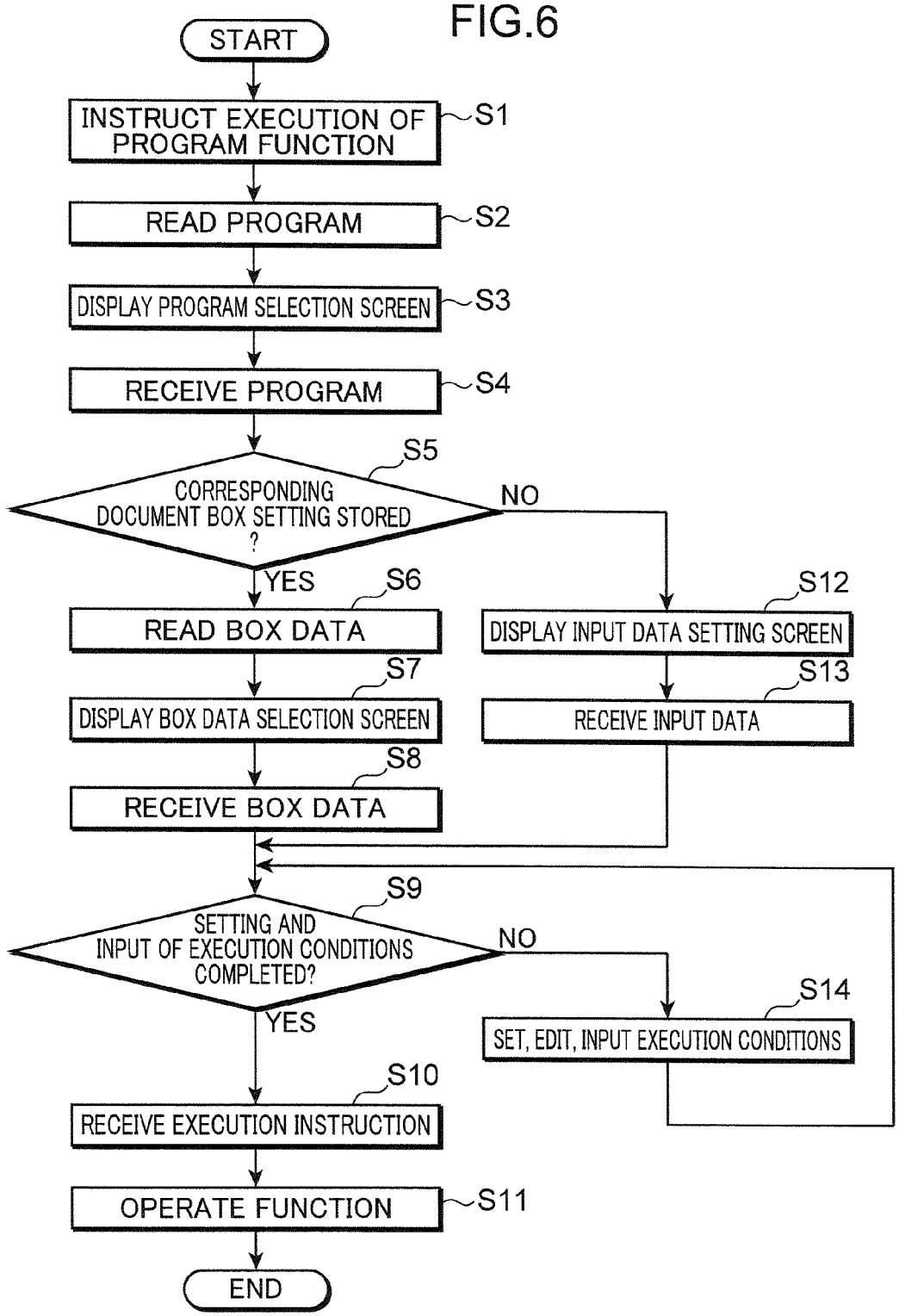
FIG. 6 is a flow chart showing the operation of the complex machine according to the first embodiment.

Next, a process of handling box data stored in the document box as input data and operating the function in accordance with the program stored in the program storage 55 in the complex machine 1 is described. FIG. 6 is a flow chart showing operations of this process.

As shown in FIG. 6, for example, when a main power supply of the complex machine 1 is turned on by a user, the program button 455 (FIG. 2) is depressed and an instruction to execute the program function is received by the instruction receiver 523 (S1), the execution controller 521 reads all the programs stored in the program storage 55 (S2). Then, the execution controller 521 sends an instruction to the display controller 522 to cause the display unit 410 to display the program selection screen on which the read programs are displayed to be selected and input (S3).

Subsequently, when the program displayed on the program selection screen is selected and input by an operation of the user performed on the touch panel or the numerical keypad 433 provided in the display unit 410 and the selected and input program is received by the program receiver 524 (S4), the execution controller 521 judges whether or not any document box is stored in correspondence with the selected and input program in the program storage 55 (S5).

Here, when judging that the document box is stored in correspondence with the selected and input program (S5; YES), the execution controller 521 obtains information indicating a storage area storing the data in the document box related to this program from the box information storage 54 and reads box data stored in the storage area indicated by the obtained information (S6). Subsequently, the execution controller 521 sends an instruction to the display controller 522 to cause the display unit 410 to display the box data selection screen on which the read box data are displayed to be able to be selected and input (S7).

For example, if the program identified by the identification information "conference copy" is received in Step S4 as shown in FIGS. 4 and 5, the execution controller 521 judges that the document box identified by the identification information "user A's box" is stored in correspondence with the received program (S5; YES). Then, the execution controller 521 obtains the information ". \box\userA" indicating the storage area storing the data in the document box indentified by the identification information "user A's box" from the box information storage 54 and reads the box data stored in the storage area indicated by the obtained information (S6). Thereafter, the execution controller 521 sends an instruction to the display controller 522 to cause the display unit 410 to display the box data selection screen on which the read box data are displayed to be able to be selected and input (S7).

Here, a case is assumed where the box data cannot be properly read such as because the removable disk is not attached to the complex machine 1 in Step S6. In this case, the execution controller 521 may send an instruction to the display controller 522 to cause the display unit 410 to display a warning, for example, by displaying the information indicating the storage area storing the data in the document box and displaying an error message to the effect that the box data cannot be properly read from the displayed storage area on the box data selection screen.

Subsequently, when the box data displayed on the box data selection screen is selected and input by an operation of the user performed on the touch panel or the numerical keypad 433 provided in the display unit 410, the selected and input box data is received by the box data receiver 525 (S8).

The setting and input of the execution conditions are completed in which the box data received in Step S8 is handled as input data and the function settings provided in the program received in Step S4 are set as function settings of the function to be operated (S9; YES). Thereafter, when an execution instruction to operate the function under the execution conditions, the setting and input of which have been completed, is received by the instruction receiver 523, for example, by depressing the start key 432 or the like (S10), the execution controller 521 operates the function in accordance with the execution conditions indicated by this execution instruction (S11).

On the other hand, when judging that no document box is stored in correspondence with the selected and input program in Step S5 (S5; NO), the execution controller 521 sends an instruction to the display controller 522 to cause the display unit 410 to display a setting screen used to set and input the input data in operating the function corresponding to this program (S12). In response to this instruction, the instruction receiver 523 receives the input data set and input on the displayed setting screen as execution conditions of the function to be operated (S13).

Note that until the execution instruction is received by the instruction receiver 523 in Step S10 (S9; NO) after the completion of Step S8 or Step S13, the execution controller 521 sends an instruction to the display controller 522 to display contents of the function settings indicated by the program received in Step S4 on the respective setting screens used to set and input the function settings and allows the contents of the function settings indicated by this program to be changed using the displayed respective setting screens to complete the setting and input of the execution conditions. Alternatively, the execution controller 521 allows the execution conditions to be edited and input such as by sending an instruction to the display controller 522 to display setting screens used to set and input other execution conditions and allowing the other execution conditions to be set and input using the displayed setting screens (S14).

For example, when this is explained using the above example, the execution controller 521 sends an instruction to the display controller 522 to display the contents of six function settings as combinations of six setting items of number of copies, sheet size, magnification, density, aggregate print and two-sided division and set values ("10 sets", "A4", "100%", "normal", "2 in 1" and "none") indicated by the program identified by the identification information "conference copy" (FIG. 5) received in Step S4 on the respective setting screens used to set and input the function settings in Step S14, and allows the contents of the function settings indicted by this program to be changed using the displayed respective setting screens. Alternatively, the execution controller 521 allows the execution conditions to be edited and input such as by sending an instruction to the display controller 522 to display setting screens used to set and input function settings as combination of other setting items of the copy function such as "document image quality" and "two-sided division" and set values for these setting items and allowing the function settings to be set and input using the displayed setting screens.

According to this configuration, the user can cause a desired function to operate in accordance with a desired program for desired box data stored in the document box by two selection and input operations of selecting and inputting the desired program on the program selection screen and selecting and inputting the box data stored in the document box related to the selected and input program on the box data selection screen.

That is, in the case of causing a desired function to operate in accordance with a desired program for desired box data stored in a document box, a user has conventionally needed to take time and effort to perform three designation operations, i.e. after performing an operation of designating a document box, performs an operation of designating desired input data from data in this document box and further performs an operation of designating the desired program out of already registered programs. Compared to this, time and effort taken for the user's operation are reduced according to the first embodiment, wherefore convenience can be improved in operating a desired function in accordance with a desired program for desired box data stored in a document box.

Further, a case is assumed where the execution conditions indicated by the execution instruction received in the instruction receiver 523 include the program registration instruction to register at least one function setting included in the execution conditions as a program in Step S11. In this case, at least one function setting included in the execution conditions may be stored as a program in the program storage 55 in correspondence with the identification information of the document box storing the input data when the execution controller 521 judges that the input data for the function to be operated included in the execution conditions is box data.

Note that a construction for including the program registration instruction in the execution conditions is, for example, as follows. The display controller 522 constantly displays a button for switching a selection state indicating program registration and a selection state indicating no program registration every time being pressed, such as by the touch panel function, on various setting screens. In accordance with this, the instruction receiver 523 receives the program registration instruction as the execution condition when this button is switched to the selected state indicating program registration in Step S10. However, there is no limitation to this construction.

According to this construction, by including the program registration instruction in the execution conditions in the case of operating the function using the box data stored in the document box as input data, at least one function setting included in the execution conditions can be easily stored as a program in the program storage 55 in correspondence with the document box at the same time as the function is operated under the execution conditions.

Thus, as compared with the case where, after performing an operation of designating the function settings for operating this function and configuring the program in an opportunity different from an opportunity of operating this function, the configured program is stored in the program storage 55 in correspondence with the document box, time and effort required for an operation in storing the program in the program storage 55 in correspondence with the document box can be reduced.

Further, as shown in a part of FIG. 3 enclosed by dotted line, the control unit 51 may include the login information storage 56 for storing login information, the login information receiver 57 for receiving the input of login information, and the login authenticator 58.

Here, the login information is, for example, composed of a combination of identification information and a password of the user. The login information receiver 57 receives login information set and input by the user on a login setting screen used to set and input the login information and displayed on the display unit 410 by the display controller 522. The login authenticator 58 allows the user identified with the login information to log in if the login information received by the login information receiver 57 is stored in the login information storage 56.

In conformity with this configuration, the document box is provided for each user identified by the login information. The execution controller 521 starts the operation in Step S2, assuming that the execution instruction of the program function is received by the instruction receiver 523 in Step S1 when the user is allowed to log in by the login authenticator 58. Further, the execution controller 521 reads the program related to the document box corresponding to the user and the programs related to none of the document boxes (S2) and sends an instruction to the display controller 522 to cause the display unit 410 to display the program selection screen on which the read programs are displayed to be able to be selected and input (S3).

For example, if the programs are stored in the program storage 55 as shown in FIG. 5, the execution controller 521 in this construction starts the operation of Step S2 when the user identified as a "user A" is allowed to log in by the login authenticator 58. Then, the execution controller 521 reads the program identified by the identification information "conference copy" related to the document box identified by the identification information "user A's box" corresponding to this user and the program identified by the identification information "company X FAX" related to none of the document boxes (S2) and sends an instruction to the display controller 522 to cause the display unit 410 to display the program selection screen on which the read programs are displayed to be able to be selected and input (S3).

According to this configuration, the program corresponding to the document box corresponding to the logged-in user is displayed on the program selection screen. Thus, in the case of selecting and inputting the input data of the function operated in accordance with the program selected and input on this program selection screen, the box data corresponding to the document box corresponding to this user can be displayed.

That is, neither unfamiliar programs related to the document boxes corresponding to other users different from this user nor unfamiliar box data stored in the document boxes corresponding to other users different from this user are displayed. Thus, it is possible to improve user convenience in selection and input operations to operate a desired function in accordance with a desired program for desired box data.

Second Embodiment

FIG. 7 is a block diagram showing the electrical construction of a complex machine 1A according to a second embodiment. The complex machine 1A includes elements which, when a user designates a document box prior to designation of a program, can handle box data stored in the document box as input data relating to execution conditions of a function and operate this function.

The construction of the complex machine 1A is identical to that of the complex machine 1 according to the first embodiment except in that a CPU 52 of a control unit 51 includes a document box receiver 526 and a functional part relating to login authentication is deleted from the control unit 51.

The document box receiver 526 receives a document box selected and input on a document box selection screen which is one of setting screens to be displayed on a display unit 410 and used to receive a selected and input document box provided in the complex machine 1A. Since the construction other than this document box receiver 526 is the same as in the first embodiment, it is not described here.

In the complex machine 1A of the second embodiment, a process of causing the complex machine 1A to handle box data stored in a document box as input data and operate a function when a user designates a program prior to designation of the document box is the same as the process described with reference to FIG. 6 in the above first embodiment.

Next, a process of causing the complex machine 1A to handle box data stored in a document box as input data and operate a function when a user designates the document box prior to designation of a program in the complex machine 1A is described using FIG. 8.

When a main power supply of the complex machine 1A is turned on by a user, a document box button 453 (FIG. 2) is depressed and an instruction to execute a document box function is received by an instruction receiver 523 (S21), an execution controller 521 reads identification information of document boxes stored in a box information storage 54 (S22). Subsequently, the execution controller 521 sends an instruction to a display controller 522 to cause the display unit 410 to display the document box selection screen on which the read identification information is displayed to be able to be selected and input (S23).

Subsequently, when the identification information of the document box displayed on the document box selection screen is selected and input by an operation of the user performed on a touch panel or a numerical keypad 433 provided in the display unit 410 and the selected and input identification information is received by the document box receiver 526 (S24), the execution controller 521 obtains information indicating a storage area related to the received identification information and showing data of the document box from the box information storage 54 and reads the box data stored in the storage area indicated by the obtained information (S25). Then, the execution controller 521 sends an instruction to the display controller 522 to cause the display unit 410 to display a box data selection screen on which the read box data are displayed to be able to be selected and input (S26).

Subsequently, when the box data displayed on the box data selection screen is selected and input by an operation of the user performed on the touch panel or the numerical keypad 433 provided in the display unit 410, the selected and input box data is received by the box data receiver 525 (S27). Then, the execution controller 521 reads programs related to the document box received in Step S24 and document box(es) different from the received document box and program(s) related to none of the document boxes from a program storage 55. That is, all the programs stored in the program storage 55 are read (S28). Subsequently, the execution controller 521 sends an instruction to the display controller 522 to cause the display unit 410 to display a program selection screen on which the read programs are displayed to be able to be selected and input (S29).

As a specific example, a case is assumed where the information indicating the storage areas storing the box data related to the identification information of three document boxes is stored in the box information storage 54 as shown in FIG. 4. In this case, when an instruction to execute the document box function is received by the instruction receiver 523 (S21), the execution controller 521 reads the identification information "user A's box", "user B's box" and "user C's box" of the three document boxes stored in the box information storage 54 (S22). Then, the execution controller 521 sends an instruction to the display controller 522 to cause the display unit 410 to display the document box selection screen on which the read identification information is displayed to be selected and input (S23).

Next, a case is assumed where the identification information "user A's box" of the document box displayed on the document box selection screen is, for example, selected and input and this identification information "user A's box" is received by the document box receiver 526 (S24). In this case, the execution controller 521 obtains the information ". \box\userA" indicating the storage area storing the data in the document box related to and identified by the received identification information "user A's box" from the box information storage 54, and reads the box data stored in the storage area indicated by the obtained information ". \box\userA" (S25). Then, the execution controller 521 sends an instruction to the display controller 522 to cause the display unit 410 to display the box data selection screen on which the read box data are displayed to be able to be selected and input (S26).

Subsequently, the box data selected and input on the box data selection screen is received by the box data receiver 525 (S27). Then, the execution controller 521 reads, as shown in FIG. 5, the program identified by the identification information "conference copy" related to the document box identified by the identification information "user A's box" received in Step S24, the program identified by the identification information "circular copy" related to the document box different from the received document box and identified by the identification information "user B's box" and the program related to none of the document boxes and identified by the identification information "company X FAX" from the program storage 55. That is, all the programs stored in the program storage 55 are read (S28). Then, the execution controller 521 sends an instruction to the display controller 522 to cause the display unit 410 to display the program selection screen on which the read programs are displayed to be able to be selected and input (S29).

Referring back to FIG. 8, when the program displayed on the program selection screen is selected and input by an operation of the user performed on the touch panel or the numerical keypad 433 provided in the display unit 410 and the selected and input identification information is received by the program receiver 524 (S30; YES), the execution controller 521 sends an instruction to the display controller 522 to display contents of function settings indicated by the received program on setting screens used to set and input the function settings (S34).

Specifically, a case is assumed where the program identified by the identification information "circular copy" (FIG. 5) displayed on the program selection screen is selected and input and the identification information "circular copy" is received by the program receiver 524 (S30; YES) based on the above example. In this case, the execution controller 521 sends an instruction to the display controller 522 to display the contents of six function settings as combinations of six setting items of "number of copies, sheet size, magnification, density, aggregate print and two-sided division" indicated by the received identification information "circular copy" and set values ("1 set", "A4", "100%", "normal", "none" and "none") for the respective setting items on the respective setting screens used to set and input the function settings.

Referring back to FIG. 8, the setting and input of the execution conditions to handle the box data received in Step S27 as input data and set the function settings indicated by the program received in Step S34 as function settings of a function to be operated are completed (S31; YES). Thereafter, when an execution instruction to operate the function under the execution conditions for which the setting and input have been completed is received by the instruction receiver 523 such as by an operation of the user to depress the start key 432 or the like (S32), the execution controller 521 operates the function in accordance with the execution conditions indicated by this execution instruction (S33).

Note that until the execution instruction is received by the instruction receiver 523 in Step S32 (S31; NO) after the completion of Step S29, the execution controller 521 allows the contents of the function settings indicated by the program received in Step S30 to be changed on setting screens displaying the contents of the function settings indicated by the program received in Step S34 to complete the setting and input of the execution conditions. Alternatively, the execution controller 521 allows the execution conditions to be edited and input such as by sending an instruction to the display controller 522 to display setting screens used to set and input other execution conditions and allowing the other execution conditions to be set and input using the displayed setting screens (S35). Thereafter, Step S30 is performed again so that the user can change the program selected and input on the program selection screen.

As just described, according to this process, when a document box is selected and input prior to a program, programs related to other document boxes different from the selected and input document box are displayed on the program selection screen. Thus, the programs related to the other document boxes different from the document box selected and input on the document box selection screen can be selected and input on the program selection screen. Therefore, time and effort required for an operation of setting and inputting function settings can be reduced as compared with the case where other function settings different from those settable by the program related to the selected document box are individually set and input.

Similar to the first embodiment, a case is assumed where the execution conditions indicated by the execution instruction received by the instruction receiver 523 includes a program registration instruction which is an instruction to register at least one function setting included in the execution conditions as a program in Step S33 described above. In this case, if the execution controller 521 judges that input data for the function to be operated included in the execution conditions is box data, at least one function setting included in the execution conditions may be stored as a program in the program storage 55 in correspondence with the identification information of the document box storing the input data.

Note that a construction for including the program registration instruction in the execution conditions is, for example, as follows. The display controller 522 constantly displays a button for switching a selection state indicating program registration and a selection state indicating no program registration every time being pressed, such as by the touch panel function, on various setting screens. In accordance with this, the instruction receiver 523 receives the program registration instruction as the execution condition when this button is switched to the selected state indicating program registration in Step S10. However, there is no limitation to this construction.

Although the embodiments have been described, taking the complex machine as an example of the image forming apparatus according to the present disclosure, the present disclosure is not limited to this and the image forming apparatus according to the present disclosure may be a printer, a copier, a scanner, a facsimile machine or another image forming apparatus.

Further, the present disclosure can be modified in various manners without being limited to the constructions of the above embodiments. The constructions and processes shown in FIGS. 1 to 8 are merely illustration of the embodiments according to the present disclosure and not of the nature to limit the present disclosure to the above embodiments.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus, comprising:
an operation unit including a display unit for displaying various setting screens used to set and input execution conditions of various functions executable in the image forming apparatus and adapted to receive the execution conditions set and input on the setting screens displayed on the display unit;
a document box for storing the input data to be processed by the execution conditions of the function as box data;
a program storage for storing a program with at least one function setting as a combination of various setting items of the function and set values for the setting items in correspondence with the document box;
a program receiver for receiving a program selected and input on a program selection screen which is one of the setting screens and used to select and input the program stored in the program storage;
a box data receiver for receiving box data selected and input on a box data selection screen which is one of the setting screens and used to select and input the box data stored in the document box;
a display controller for causing the display unit to display the various setting screens; and
an execution controller for causing the image forming apparatus to operate the function with the function settings provided in the program;
wherein the execution controller:
causes the display controller to display the box data stored in the document box related to the received program on the box data selection screen when the program is received by the program receiver; and
completes the setting of the execution conditions, in a format that is no longer modifiable, by handling the received box data as the input data to be processed by the execution of the function at the same time as the box data selected and input on the displayed box data selection screen is received by the box data receiver and operates the function to be operated with the function settings provided in the received program.

2. An image forming apparatus according to claim 1, wherein:
the setting screens are so configured that a program registration instruction indicating registration of at least one function setting included in the execution conditions set and input on the setting screens as the program can be set and input as the execution condition; and
the execution controller causes the at least one function setting included in the execution conditions to be stored as the program in the program storage in correspondence with the document box storing the input data if judging that the input data for the function to be operated is the box data when the program registration instruction is included in the execution conditions.

3. Image forming apparatus according to claim 1, further comprising:
a login information storage for storing login information;
a login information receiver for receiving the login information set and input on a login setting screen which is one of the setting screens and used to set and input the login information; and
a login authenticator for allowing a user identified by the login information to log in if the login information received by the login information receiver is stored in the login information storage;
wherein:
the document box is provided for each user identified by the login information; and
the execution controller causes the program related to the document box corresponding to the user to be displayed on the program selection screen when the user is allowed to log in by the login authenticator.

4. An image forming apparatus according to claim 1, further comprising a document box receiver for receiving the document box selected and input on a document box selection screen which is one of the setting screens and used to select and input the document box provided in the image forming apparatus, wherein the execution controller:
causes the box data stored in the received document box to be displayed on the box data selection screen when the document box is received by the document box receiver;
causes the display controller to display the program related to another document box different from the document box received by the document box receiver and stored in the program storage on the program selection screen when the box data selected and input on the displayed box data selection screen is received by the box data receiver; and
handles the received box data as the input data to be processed by the execution of the function and operates the function to be operated with the function settings provided in the received program after the program selected and input on the displayed program selection screen is received by the program receiver.

5. An image forming apparatus, comprising:
an operation unit including a display unit for displaying various setting screens used to set and input execution conditions of various functions executable in the image forming apparatus and adapted to receive the execution conditions set and input on the setting screens displayed on the display unit;
a document box for storing the input data to be processed by the execution conditions of the function as box data;
a program storage for storing a program with at least one function setting as a combination of various setting items of the function and set values for the setting items in correspondence with the document box;
a document box receiver for receiving a document box selected and input on a document box selection screen which is one of the setting screens and used to select and input the document box provided in the image forming apparatus;

a program receiver for receiving a program selected and input on a program selection screen which is one of the setting screens and used to select and input the program stored in the program storage;

a box data receiver for receiving box data selected and input on a box data selection screen which is one of the setting screens and used to select and input the box data stored in the document box;

a display controller for causing the display unit to display the various setting screens; and an execution controller for causing the image forming apparatus to operate the function with the function settings provided in the program;

wherein the execution controller:

causes the display controller to display the box data stored in the received document box on the box data selection screen when the document box is received by the document box receiver;

causes the display controller to display the program related to another document box different from the document box received by the document box receiver and stored in the program storage on the program selection screen when the box data selected and input on the displayed box data selection screen is received by the box data receiver; and completes the setting of the execution conditions, in a format that is no longer modifiable, by handling the received box data as the input data to be processed by the execution of the function at the same time as the box data selected and input on the displayed box data selection screen is received by the box data receiver and operates the function to be operated with the function settings provided in the received program.

6. An image forming apparatus according to claim 5, wherein:

the setting screens are so configured that a program registration instruction indicating registration of at least one function setting included in the execution conditions set and input on the setting screens as the program can be set and input as the execution condition; and the execution controller causes the at least one function setting included in the execution conditions to be stored as the program in the program storage in correspondence with the document box storing the input data if judging that the input data for the function to be operated is the box data when the program registration instruction is included in the execution conditions.

* * * * *